Dec. 19, 1950     G. C. WILHIDE     2,534,891
CUP BRUSH

Filed Aug. 4, 1945     2 Sheets-Sheet 1

Inventor
Glenn C. Wilhide
By Thomas W. Y. Clark
Attorney

Witness
Porter B. Hauth

Dec. 19, 1950 G. C. WILHIDE 2,534,891
CUP BRUSH
Filed Aug. 4, 1945 2 Sheets-Sheet 2

Inventor
Glenn C. Wilhide

WITNESS

Patented Dec. 19, 1950

2,534,891

UNITED STATES PATENT OFFICE 2,534,891

CUP BRUSH

Glenn C. Wilhide, Towson, Md., assignor to The Black and Decker Manufacturing Company, a corporation of Maryland Application August 4, 1945, Serial No. 608,865

4 Claims. (Cl. 15—181)

This invention relates to a modification of the brush structure shown in my co-pending application Serial No. 608,864 filed concurrently herewith. In that application there was described a tuft-holding disk adapted for making a cylindrical brush of one or more sections, it being the intention that the brush should be of generally cylindrical structure with the tufts being radially directed. In the instant invention the tufts are cup-shaped, or shaped like the frustum of a cone. Brushes of this type are useful for cleaning castings, molds, gears, storage battery parts, welds, forged and hardened parts, and for removing paint and other foreign material from bodies preparatory to painting or other treatment. The bristles are arranged in conical shape and they are extremely useful in cleaning smooth surfaces, whether plain or curved, and for getting around bosses and into angles such as are found in crank cases of castings of engines and other places.

The objects of the invention are to produce a cup-shaped brush which will be sturdy and rigid and of simple construction, and which may be made of varying sizes simply by the addition of identical sections one to the other. Spacers and fillers are not required.

Other objects and advantages of the invention will be apparent from the following description and the accompanying drawings forming a part hereof and in which.

In the drawings similar numerals refer to similar parts throughout the several views.

Figure 1:
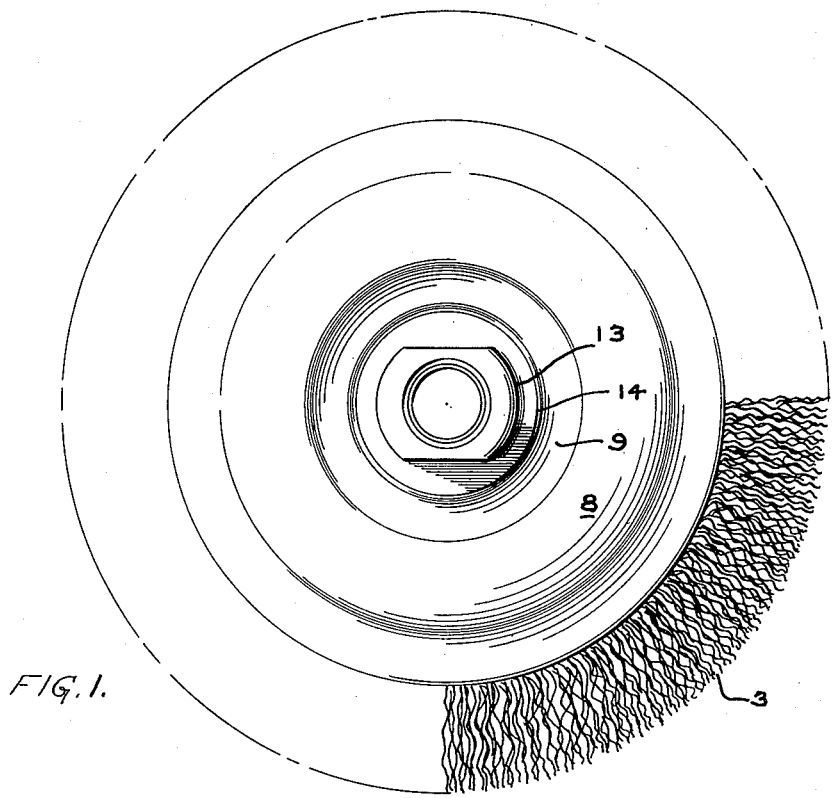
Figure 1 is a top plan view of a brush involving this invention, part of the tufts being shown and part indicated.

The brush is made up of a plurality of tuft-holding disks 1. These disks have peripheral orifices 2 therein in which are placed tufts of wire 3 and the external diameter of each orifice 2 is then clamped tightly against the center of the tufts as shown at 4. This structure of these disks is identical to that shown in Potter Patent #2,290,575, July 21, 1942.

The center of each disk has preferably six axial cuts 5 therein forming six circular segments 6. Each alternate segment is projected on opposite sides of the disk forming shoulders 7.

Figure 2:
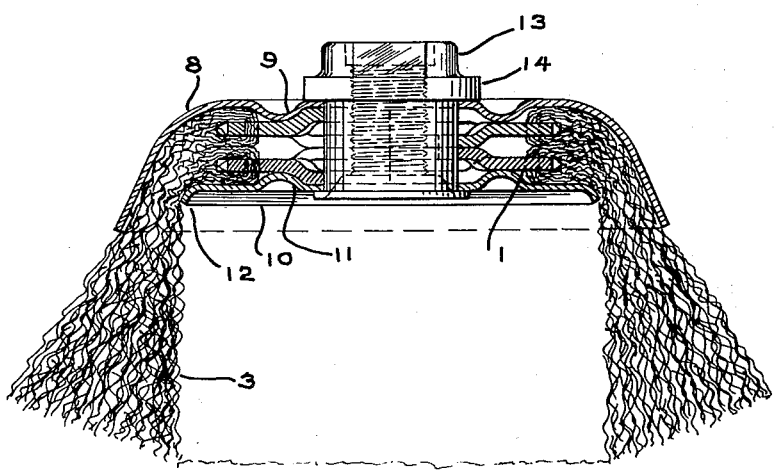
Figure 2 is a center cross sectional view thereof.
Figures 3, 4, 5, 6:
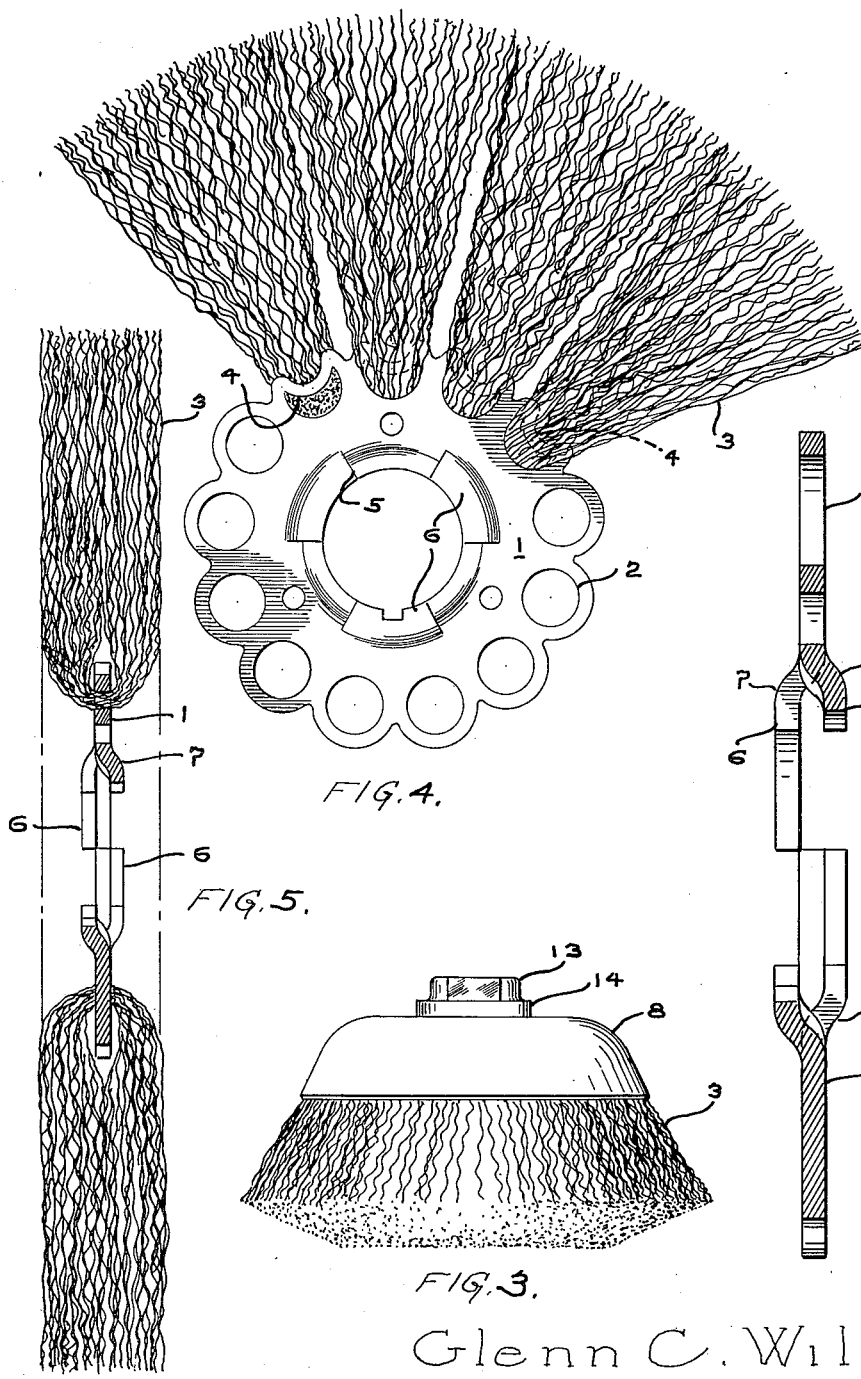
Figure 3 is a side elevational view thereof.
Figure 4 is a side view of a single tuft-holding disk showing four tufts therein.
Figure 5 is a center cross sectional view of a tuft-holding disk with tufts therein.
Figure 6 is a center cross sectional view of a disk before the tufts are inserted.

In assembling a brush two or more such disks are placed side by side as shown in Figure 2. The projecting sections or segments 6 then space the disks apart at the center. A cup-shaped member 8 is then placed down around the disks, bending the wire tufts into cup shape or frustoconical shape. The cup-shaped member 8 preferably has a shoulder or groove 9 therein to securely nest with the shoulders 7 on the outside disk. A flange 10 is placed adjacent the bottom disk and it has a corresponding groove or shoulder 11 nesting with the adjacent shoulder 7. The flange 10 preferably has its periphery 12 turned downward to form a tight clamp with the cup-shaped member 8 upon the extending tufts 3. A hub member 13 having an extending shoulder 14 is then placed through the cup-shaped member 8, the disks 1 and the flange 10. The inner end of the hub member is then spread or rolled to firmly hold the assembled parts together.

The hub member 13 is shown as threaded for mounting on a threaded spindle but other means could be used for attaching the brush to the spindle.

It will be apparent that the brush of this invention requires no spacers or fillers; that the parts are rigidly and firmly held together; that a minimum number of parts are required; that the tuft-holding disks are identical one to another; and that they are likewise identical to those usable in a wheel brush; thus obtaining economy of manufacture.

It will be apparent that many changes and modifications of the structure shown may be made without departing from the invention.

What is claimed as new and is desired to be secured by Letters Patent is:

1. A brush comprising a plurality of side-by-side tuft holding disks, U-shaped tufts mounted at their bights circumferentially in the disk, the tufts extending radially from each side of the disk, each disk being axially perforated and having a plurality of circular segments extending at the axial edge of the axial perforation circularly alternately from each opposite side thereof, segments directed toward adjacent disks being in register, to space the disks apart for the tufts to pass therebetween, a cup shaped member enclosing the assembled disks from one side and constraining the tufts to a frusto-conical position, a tuft directing flange on the other side of the assembled disks and a hub passing through the member, disks and flange to hold the same together.

2. A brush comprising a plurality of side-by-side tuft holding disks, U-shaped tufts mounted at their bights circumferentially in the disk, the tufts extending radially from each side of the disk, each disk being axially perforated and having at the axial edge of the axial perforation three projections on each side thereof, those on one side being interspaced with those on the other side, and all being an equal distance from the disk center and from each other, projections pointing toward adjacent disks being in register, to space the disks apart for the tufts to pass therebetween, a cup shaped member enclosing the assembled disks from one side and constraining the tufts to a frusto-conical position, a tuft directing flange on the other side of the assembled disks and a hub passing through the member, disks and flange to hold the same together.

3. A brush comprising a plurality of tuft holding disks, U-shaped tufts mounted at their bights circumferentially in the disk, the tufts extending radially from each side of the disk, each disk being axially perforated and being cut radially at the axial edge of the axial perforation to form an even number of segments, each alternate segment projecting from the opposite side of the disk, there being a plurality of segments on each side, segments projecting toward adjacent disks being in register to space the disks apart for the tufts to pass therebetween, a cup shaped member enclosing the assembled disks from one side and constraining the tufts to a frusto-conical position, a tuft directing flange on the other side of the assembled disks and a hub passing through the member, disks and flange to hold the same together.

4. A brush comprising a plurality of side-by-side tuft holding disks, U-shaped tufts mounted at their bights circumferentially in the disk, the tufts extending radially from each side of the disk, each disk being axially perforated and having at the axial edge of the axial perforation three projections on each side thereof, those on one side being interspaced with those on the other side, and all being an equal distance from the disk center and from each other, projections pointing toward adjacent disks being in register, to space the disks apart for the tufts to pass therebetween, a cup shaped member enclosing the assembled disks from one side and constraining the tufts to a frusto-conical position, a tuft directing flange on the other side of the assembled disks and a hub having a cylindrical portion and an integral shoulder portion, the cylindrical portion passing through the member, disks and flange, the shoulder portion bearing on the member, and the end of the cylindrical portion being bent outwardly over the flange to hold the assembly together.

GLENN C. WILHIDE.

REFERENCES CITED

The following references are of record in the file of this patent:

UNITED STATES PATENTS

| Number | Name | Date |
| --- | --- | --- |
| 1,561,280 | Radinse | Nov. 10, 1925 |
| 1,829,665 | Mertes | Oct. 27, 1931 |
| 2,062,047 | Bickel et al. | Nov. 24, 1936 |
| 2,136,747 | Levoy | Nov. 15, 1938 |
| 2,309,553 | Twyning | Jan. 26, 1943 |